F. E. HARPST.
RADIUS ROD.
APPLICATION FILED OCT. 31, 1916.
1,230,157.
Patented June 19, 1917.
2 SHEETS—SHEET 1.
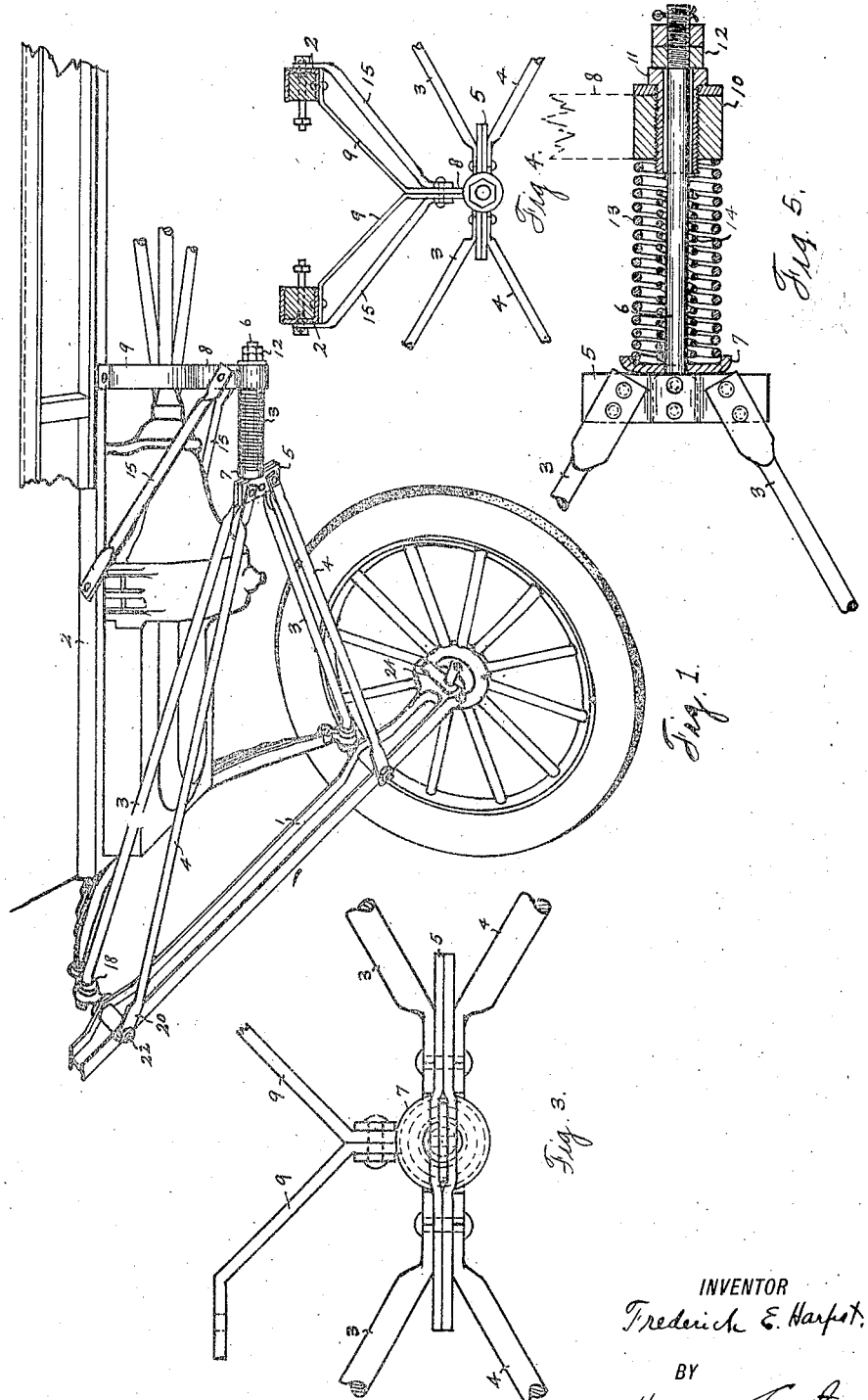
INVENTOR
Frederick E. Harpst.
BY
Hardway Catlin
ATTORNEYS

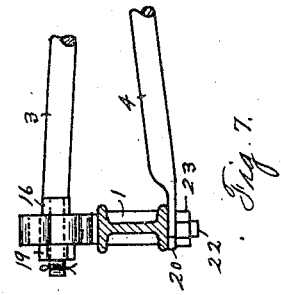
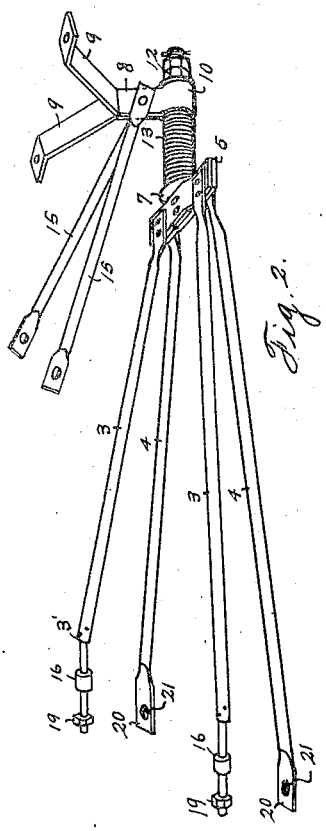
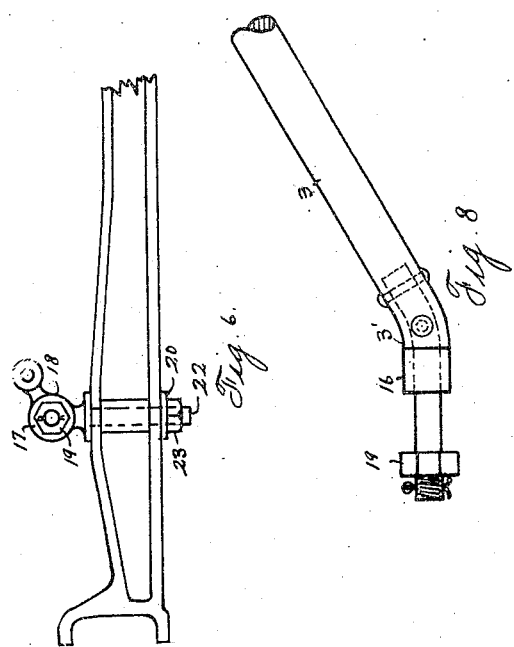

UNITED STATES PATENT OFFICE.

FREDERICK E. HARPST, OF LUFKIN, TEXAS.

RADIUS-ROD.

1,230,157.  Specification of Letters Patent.  Patented June 19, 1917.

Application filed October 31, 1916. Serial No. 128,717.

*To all whom it may concern:*

Be it known that I, FREDERICK E. HARPST, a citizen of the United States, residing at Lufkin, in the county of Angelina and State of Texas, have invented certain new and useful Improvement in Radius-Rods, of which the following is a specification.

This invention relates to new and useful improvements in radius rods and has more particular relation to an improvement in that type of radius rods which are designed to brace and hold the front axle in alinement and which as at present constructed are anchored to the crank case.

The object of the invention is to provide a radius rod which will hold more effectively the front axle in alinement for steering purposes, yet without danger of breakage or damage to the crank case, motor and connecting parts, so often caused by impact from the front axle being transmitted through the form of rod now in common use connected to the crank case.

Another feature of the invention resides in an anchorage secured to the vehicle frame and a resilient connection of the radius rod thereto.

With the above and other objects in view the invention has particular relation to certain novel features of construction, operation and arrangement of parts, an example of which is given in this specification and illustrated in the accompanying drawings wherein:

Figure 1 is a perspective view of the radius rod as applied to an automobile.

Fig. 2 is a perspective view thereof shown detached.

Figs. 3 and 4 show fragmentary views as viewed from the front and rear respectively.

Fig. 5 shows a sectional view of the resilient connection of the radius rod with its anchor.

Figs. 6 and 7 show a front elevation and a transverse sectional view respectively of the front axle of an automobile showing the method of securing the radius rod thereto, and Fig. 8 shows a front end view of the upper member of the radius rod.

Referring now more particularly to the drawing wherein like numerals of reference designate similar parts in each of the figures the numeral 1 refers to the front axle of the car and the numerals 2, 2 refer to the side members of the frame thereof. The radius rod is formed of two upper and two lower members 3, 3 and 4, 4, respectively whose forward ends are secured to the front axle and which converge rearwardly and extend back beyond the motor and are secured to the cross head 5 by bolts or rivets or any other desirable means. In Fig. 1 the members 3 and 4 are shown pivoted to the cross head, while in Fig. 5 they are shown rigidly connected thereto. In case these rods are pivoted to the cross head, they form a non-rigid truss and should one of the front wheels come in contact with an object, it will cause a rearward thrust against the corresponding arm of the truss and will operate through the cross head to cause a forward thrust to be transmitted to the other side of the truss and there will thus be no liability of breaking the truss loose from an axle. The cross head 5 has a rearwardly extending stud 6, which may be pivoted thereto, as shown in Fig. 1, or rigidly secured thereto as shown in Fig. 5 and provided with a disk like bearing 7 for a purpose to be hereinafter described. The numeral 8 refers to a hanger having the arms 9, 9, whose upper ends are riveted or otherwise secured to the side members of the frame, the lower end of the hanger being formed into a bearing 10 threaded through which is the guide 11 through which the stud 6 slides, the outer end of the stud being threaded to receive a securing nut as 12. Interposed between the bearings 7 and 10 is a coil spring 13 which receives the ordinary shock sustained by the front axle in use and within said coil spring 13 and closely surrounding the stud 6 is a stronger coil spring 14 one end of which rests against the bearing 7 and the other end of which is normally free but which in case of unusual stress against the front axle receives the inner end of the guide 11 thus reinforcing the outer spring 13. The numerals 15, 15, refer to tie bars attached at their ends to the hanger 8 and to the corresponding side members of the car, respectively, said tie bars sustaining the principal part of the shock to the hanger and transmitting the same to the side members of the frame. The forward end of each member 3 is reduced, forming an annular shoulder as at 3' said reduced end having a removable collar 16 fitted thereon and normally resting against said shoulder. Said reduced end extends through the bearing 17 of the spring perch 18 and is secured therein by means of the nut 19 threaded on to the outer end thereof. The forward end of the lower member 4, of the radius rod is flattened as at 20 said flattened end having an orifice 21 to receive the lower end of the bolt 22, of the spring perch, which extends through a vertical bearing in the front axle and the lower end of which receives the nut 23 which is threaded thereon and clamps the said end 20 between said nut and the lower side of the axle. It is obvious that the collar 16 may be varied in thickness. In ordinary use it will be made of such thickness as to bring the front axle in vertical alinement so that the spindle bearing 24 will be in vertical position and so receive the load. In some cases, however, it has been found desirable in actual use to give the front axle and the spindle bearing a slight inclination or tilt which may be done by making the collar 16 thinner than usual and tightening up the nut 19. This will give a caster effect to the spindle bearing and have a tendency to cause the guide wheels to right themselves in case they strike an obstruction thus causing the machine to better keep the road.

The stud 6 is in direct alinement with the center of the front axle and owing to the truss formation of the rod and the hanger supports, any force or shock received by the axle 1 will be transmitted in a direct line with the stud 6 and received first by the spring 13 and in case of great shock will be sustained also by the spring 14, the latter spring reinforcing the former in cases of necessity.

In case the radius rod is connected to the engine case as now in common use when obstructions are encountered by the steering wheels the shock is transmitted through the front axle to said radius rod and its anchorage often either bending said rod or tearing loose the hangers by means of which it is connected to the engine case and in case of sudden impact of the steering wheels or front axle against a body of high inertia the engine case is liable to be torn loose from the frame or caved in at the point where the rod is fastened thereto, causing injury to the motor and other connecting parts of the vehicle and the connection of the radius rod as at present used with the motor case being rigid, the shock is transmitted to the entire vehicle and the occupants thereof. Furthermore the rigidity causes great stress on the tires and bearings causing wear and stress upon the same as well as upon connecting parts. My improved form of radius rod being resiliently connected to an independent hanger relieves the motor case of all liability to injury from the shocks received by the front wheels and the connection to said hanger being resilient, said shocks are in a great measure, if not entirely, absorbed by said resilient connection thus absorbing the shock received by the front wheels and axle and preventing the transmission thereof to the frame of the vehicle and to the passengers and lessening the liability of breakage of any of the connecting parts.

What I claim is:

1. A device of the character described including two upper and two lower members secured at their forward ends to the front axle of the vehicle, said members converging and their rear ends being secured together forming a truss the lower members being fixed relative to the front axle and the upper members being adjustable relative thereto, a hanger secured to the vehicle frame and a yieldable connection between the rear ends of said members and said hanger.

2. A device of the character described including a truss structure composed of two upper and two lower members connected at their forward ends to the front axle of a vehicle and their rear ends converging and being secured to a cross head, means for adjusting the forward ends of the upper members relative to the axle, a hanger having a bearing, a bearing member secured to the cross head and operating through said bearing and a yieldable member interposed between said cross head and bearing.

3. A radius rod composed of side members attached at their forward ends to the front axle of a vehicle and their rear ends converging and being secured together, a bearing secured to and depending from the vehicle frame, a bearing member secured to the rear ends of the said side members and operating through said bearing and a plurality of yieldable members of unequal resistance interposed between said radius rod and said bearing.

4. A device of the character described including a truss composed of two upper and two lower members connected at their forward ends to the front axle of the vehicle and their rear ends converging and being pivoted to a cross head, a hanger having a bearing, a bearing member pivoted to the cross head and operating through said bearing, and a yieldable member interposed between said cross head and bearing.

5. A device of the character described including a truss whose arms are connected at their free ends to the front axle of the vehicle, a central hanger depending from the vehicle and having a bearing, a bearing member secured to said truss and operating through said bearing and a yieldable member interposed between said truss and bearing.

6. A radius rod composed of side members attached at their forward ends to the front axle of the vehicle and having their rear ends joined together, forming a truss. a central bearing secured to and depending from the vehicle frame, a bearing member secured to the truss and operating through said bearing, and a yieldable connection between said truss and bearing.

In testimony whereof I have signed my name to this specification in the presence of two subscribing witnesses.

FREDERICK E. HARPST.

Witnesses:
F. A. LIDDELL,
FLORENCE JOHNSTON.